United States Patent [19]
Satoh et al.

[11] Patent Number: 5,173,886
[45] Date of Patent: Dec. 22, 1992

[54] COMPOSITE OPTICAL DISC HAVING BOTH A DATA READ-ONLY AREA AND A DATA REWRITABLE AREA, AND A RECORDING/REPRODUCING SYSTEM FOR USE THEREWITH

[75] Inventors: Isao Satoh, Nayagawa; Yoshihisa Fukushima, Osaka; Makoto Ichinose, Sakai; Yuzuru Kuroki, Toyonaka; Yuji Takagi, Neyagawa, all of Japan

[73] Assignee: Matsushita Electric Industrial Co., Ltd., Osaka, Japan

[21] Appl. No.: 635,238

[22] Filed: Dec. 28, 1990

Related U.S. Application Data

[60] Continuation of Ser. No. 353,171, May 17, 1989, Pat. No. 5,023,854, Division of Ser. No. 7,641, Jan. 28, 1987, abandoned.

[30] Foreign Application Priority Data

| Feb. 7, 1986 | [JP] | Japan | 61-26374 |
| Feb. 7, 1986 | [JP] | Japan | 61-26376 |
| Feb. 13, 1986 | [JP] | Japan | 61-29256 |
| Feb. 24, 1986 | [JP] | Japan | 61-38839 |
| Mar. 4, 1986 | [JP] | Japan | 61-46533 |
| May 19, 1986 | [JP] | Japan | 61-113934 |
| Jun. 3, 1986 | [JP] | Japan | 61-128669 |

[51] Int. Cl.$^5$ .............................. G11B 7/085
[52] U.S. Cl. ..................... 369/32; 369/44.29; 369/44.36; 369/48; 369/54; 369/58; 369/116; 369/275.2.275.3
[58] Field of Search ............. 369/14–15, 369/32, 44.29, 44.31, 44.36, 44.39, 47–50, 54, 58, 100, 106, 116, 124, 275.1–275.5, 283, 13, 44.28; 358/335, 342

[56] References Cited

U.S. PATENT DOCUMENTS

| 4,229,808 | 10/1980 | Hui | 369/48 |
| 4,269,917 | 5/1981 | Drexler et al. | 346/135.1 X |
| 4,296,491 | 10/1981 | Jerome | 369/275 X |
| 4,301,486 | 11/1981 | Brown et al. | 360/99 |
| 4,385,372 | 5/1983 | Drexler | 369/275 X |

(List continued on next page.)

FOREIGN PATENT DOCUMENTS

| 0089020 | 9/1983 | European Pat. Off. |
| 0164131 | 12/1985 | European Pat. Off. |
| 59-154652 | 9/1984 | Japan |
| 60-38735 | 2/1985 | Japan |
| 60-237682 | 11/1985 | Japan |
| 60-261041 | 12/1985 | Japan |
| 61-5442 | 1/1986 | Japan |
| 61-222033 | 10/1986 | Japan |

OTHER PUBLICATIONS

IBM Technical Disclosure, "Video Disk With Updating Feature", Bruce, C. A. et al., vol. 22, No. 3, Aug./1979.

(List continued on next page.)

Primary Examiner—Wayne R. Young
Attorney, Agent, or Firm—Stevens, Davis, Miller & Mosher

[57] ABSTRACT

A composite read-only and rewritable type optical disc, and a disc drive apparatus for reading/writing data into the disc. The optical disc has a plurality of sectors forming a data read-only area and a write/read area. The disc includes a recording film formed over its entire surface by which data can be recorded on the disc. Each area has track sectors each having a sector identifier portion in which address information is recorded and a data field portion to record data. Data-field identification flags indicative of the read-only area and the write/read area are recorded in the respective identifier portions. On reading or writing this optical disc, the data field identification flag is detected to identify the kind of related area, i.e., whether it is a read-only area or a write/read area. Thus, it is possible to avoid erroneous recording of data into the read-only area. Upon executing a reading operation, waveform equalization and binary-clipping level of reproduction signals can be well controlled. The gain of the servo loop can be switched. The track searching operation can be stably performed. The reading and writing of data with respect to the data write/read area can be improved.

1 Claim, 11 Drawing Sheets

U.S. PATENT DOCUMENTS

| | | | |
|---|---|---|---|
| 4,417,330 | 11/1983 | Hazel et al. | 369/100 X |
| 4,467,383 | 8/1984 | Ohta et al. | 369/275 X |
| 4,484,319 | 11/1984 | Koishi et al. | |
| 4,507,763 | 3/1985 | Kato | 369/275 X |
| 4,509,161 | 4/1985 | Vande Leest et al. | 369/275 |
| 4,523,304 | 6/1985 | Satoh et al. | 358/335 X |
| 4,527,263 | 7/1985 | Nakagawa | 369/58 X |
| 4,546,462 | 10/1985 | Koishi et al. | 369/54 X |
| 4,561,082 | 12/1985 | Gerard et al. | 369/275 X |
| 4,570,251 | 2/1986 | Yokota et al. | 369/116 X |
| 4,580,255 | 4/1986 | Inoue et al. | 369/48 X |
| 4,583,208 | 4/1986 | Verboom | 369/44 X |
| 4,592,036 | 5/1986 | Furuya et al. | 369/48 X |
| 4,594,701 | 6/1986 | Earman et al. | 369/44 X |
| 4,599,718 | 7/1986 | Nakagawa et al. | 369/275 X |
| 4,607,358 | 8/1986 | Maeda et al. | 369/44 |
| 4,611,314 | 9/1986 | Ogata et al. | 369/48 X |
| 4,611,316 | 9/1986 | Takeuchi et al. | 369/44 |
| 4,611,317 | 9/1986 | Takeuchi et al. | 369/50 X |
| 4,663,751 | 5/1987 | Kaku et al. | 369/46 |
| 4,669,077 | 5/1987 | Gerard et al. | 369/275 |
| 4,674,071 | 6/1987 | Okumura et al. | 369/48 |
| 4,677,606 | 6/1987 | Ogata et al. | 369/48 X |
| 4,701,603 | 10/1987 | Dakin et al. | |
| 4,760,566 | 7/1988 | Kobayashi et al. | 369/48 |
| 4,774,700 | 9/1988 | Satoh et al. | 369/54 |

OTHER PUBLICATIONS

Patent Abstracts of Japan, vol. 10, No. 22 (p.-424)[2079], Jan. 28, 1986.
Patent Abstracts of Japan, vol. 10, No. 152 (p.-462)[2208], Jun. 3, 1986.
Patent Abstracts of Japan, vol. 8, No. 121 (p.-278)[1558], Jun. 7, 1984.
Patent Abstracts of Japan, vol. 6, No. 192 (p.-145)[1070], Sep. 30, 1982.
Patent Abstracts of Japan, vol. 10, No. 123 (p.-469)[2229], Jun. 18, 1986.
F. J. Dallmans, European Search Report, EP87300789, 4 pages, Oct. 6, 1988.

FIG. I(a)
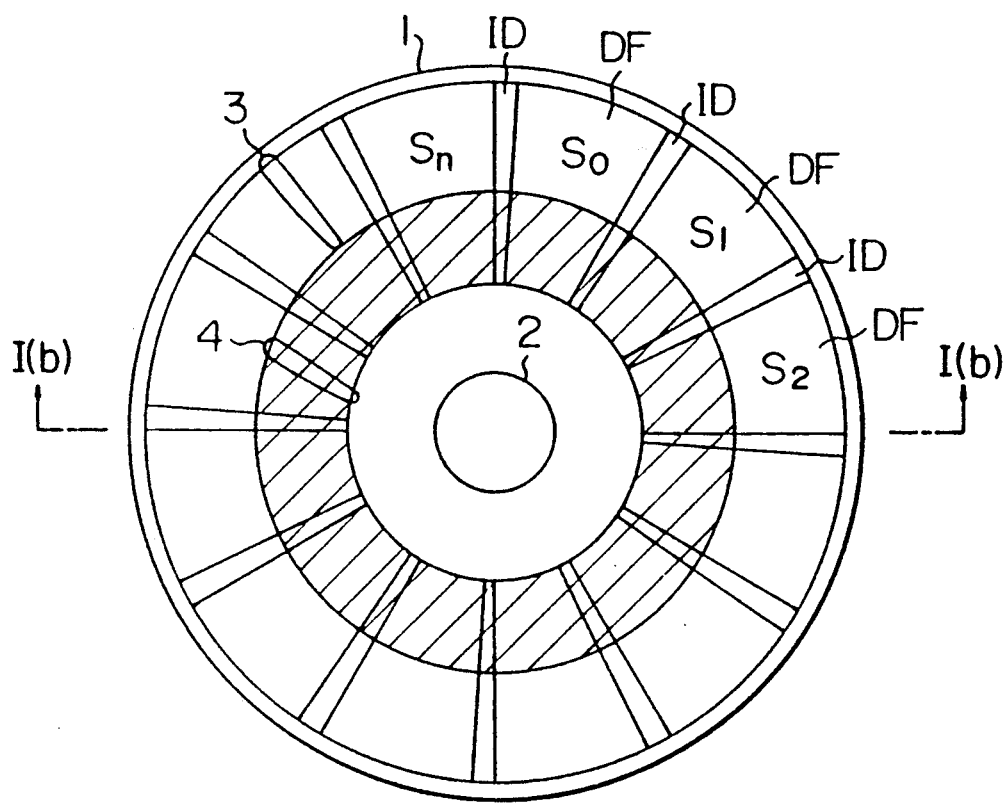
FIG. I(b)
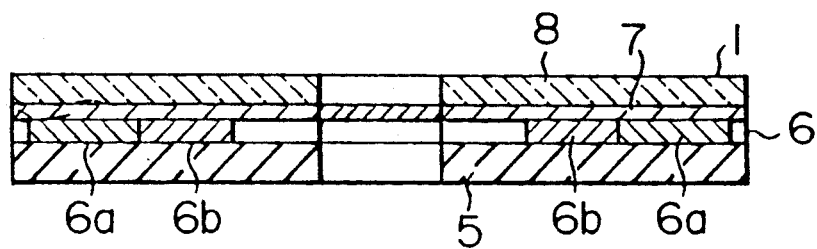

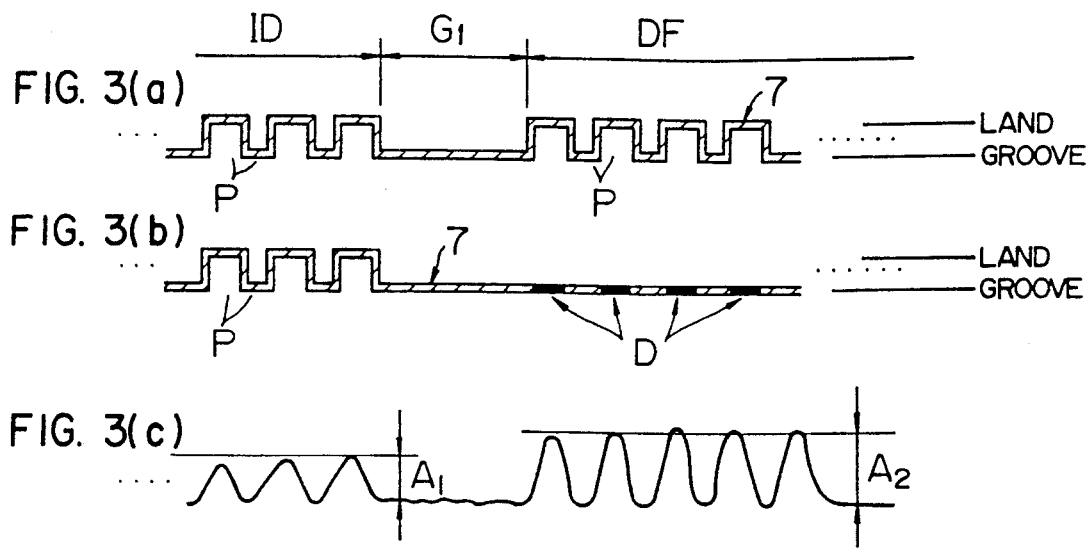
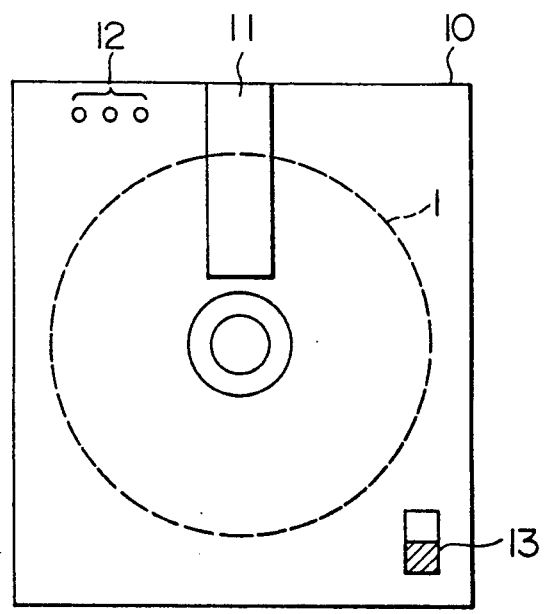

COMPOSITE OPTICAL DISC HAVING BOTH A DATA READ-ONLY AREA AND A DATA REWRITABLE AREA, AND A RECORDING/REPRODUCING SYSTEM FOR USE THEREWITH

This is a division of application Ser. No. 353,171 filed May 17, 1989 (which issued as U.S. Pat. No. 5,023,854 on Jun. 11, 1991), which in turn is a continuation of Ser. No. 007,641 filed Jan. 28, 1987 (abandoned).

BACKGROUND OF THE INVENTION

The present invention relates to an optical disc on and from which data is recorded and reproduced and to a disc drive apparatus for writing and reading data into and from such an optical disc and, in particular, to an optical disc in which data can be additionally written on a read only type optical disc and to a drive apparatus for writing and reading data into and from such an optical disc. As an external memory which can store a large amount of data, attention is paid to an optical disc drive apparatus using a read-only type optical disc (hereinafter, referred to as an R/O disc) in which data is recorded on a disc-shaped plastic material in the form of concave and convex pits or phase structure of the submicron order and the data is reproduced by irradiating a laser beam having a diameter of about 1 μm.

The R/O disc is formed in the following manner. The data modulated concave and convex pits of the submicron order are formed on a plastic resin made of polycarbonate or the like having a thickness of 1.2 mm. A reflecting layer made of aluminum or the like is evaporation deposited on the surface of the plastic resin and thereafter, a protecting layer is coated on the reflecting layer. Although the R/O disc has a diameter of 12 cm and a memory capacity of hundreds of megabytes, additional data cannot be recorded.

Various uses and applications of such an R/O disc are considered due to various advantages such that its memory capacity is large, random access can be performed, a number of duplicate discs can be easily produced, and the cost is low. For example, the R/O disc can be used as a disc in which the dictionary or font patterns for use in data base or word processors are stored, or as a disc in which programs or operating manually of computers are stored.

However, the foregoing R/O disc is of the read-only type and is manufactured in a particular factory. Therefore, it is impossible for the user to use the disc by adding his preferred extra data to the dictionary or font patterns of the data base or word processor which were supplied in the R/O disc. In addition, patch cannot be added in order to correct bug in the program. Therefore, the R/O disc has a problem such that its application field in computers is limited.

SUMMARY OF THE INVENTION

In consideration of the foregoing problems, it is an object of the present invention to provide an optical disc in which the user can record additional data to the R/O disc and from which the user can well reproduce the data in the read-only area and those in the data recording area and further to provide a drive apparatus for writing and reading data into and from such an optical disc.

According to the present invention, an optical disc is formed in the following manner. Namely, a recording material is formed in all of the tracks. A plurality of sectors are formed in the tracks. A sector has a sector identifier for identifying the sector in which address information is recorded and a data field portion to record data. A data field identification flag indicative of a read-only area or a data recording/reproducing area is recorded in the respective sector identifier. In this optical disc, the data field identification flag is detected. The kind of the area of a current sector is discriminated on the basis of the detected data field identification flag. Thus, erroneous recording of data into the read-only area can be prevented. The waveform equalization and binary-clipping level of the reproduced data signal can be controlled upon reproduction of the data. The gain of the servo loop can be switched. The track searching operation can be stably performed.

BRIEF DESCRIPTION OF THE DRAWINGS

FIGS. 1(a) and 1(b) are a plan view and a cross-sectional view of an embodiment of an optical disc according to the present invention, respectively;

FIG. 3(a-t) shows enlarged cross sectional views of tracks of the optical disc and corresponding reproduced signal waveforms in the embodiment;

FIG. 4 is an external view of an embodiment of a cartridge of the optical disc of the invention;

DESCRIPTION OF THE PREFERRED EMBODIMENTS

Figure 2:
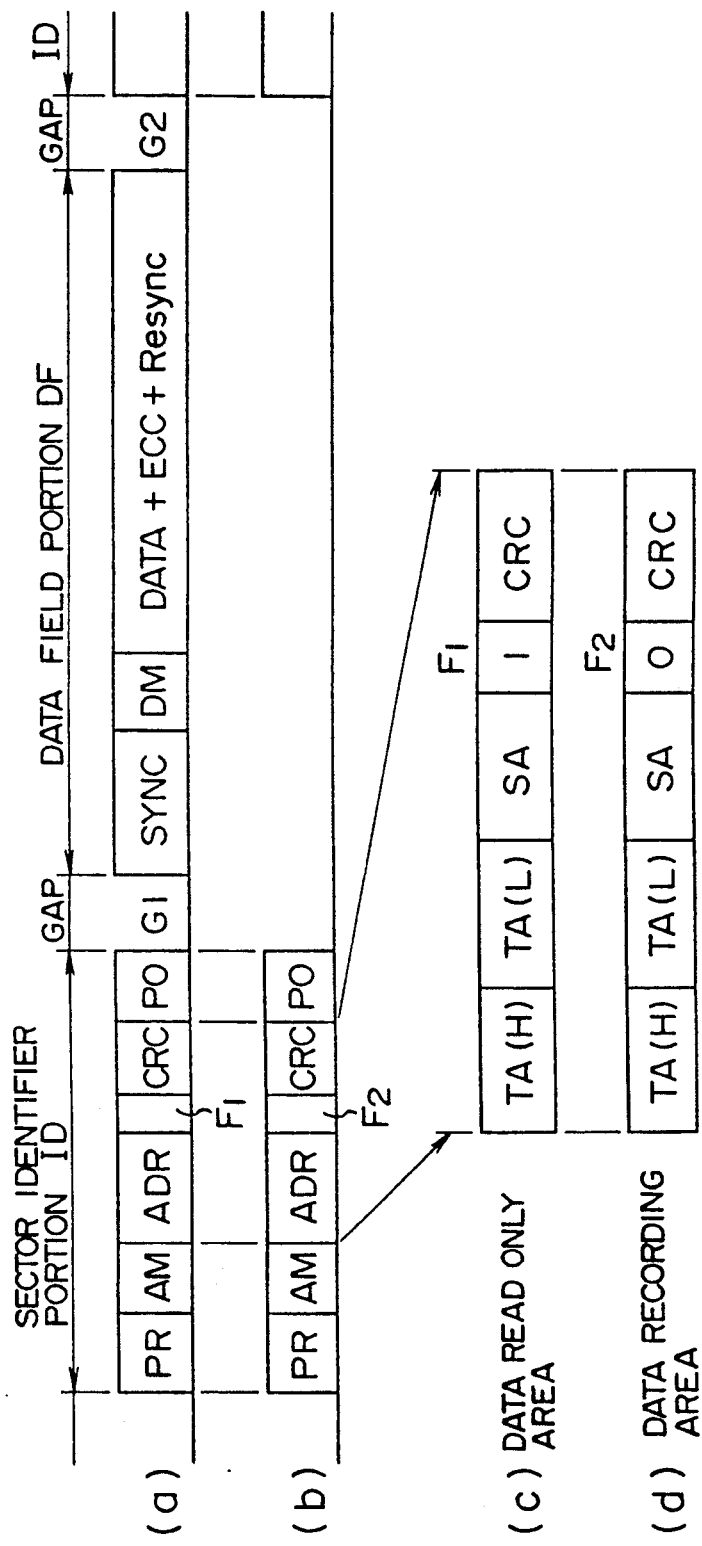
FIG. 2 shows signal formats for the embodiment.

FIG. 1 shows an external view of an embodiment of an optical disc of the present invention. FIG. 1(a) is a plan view of the optical disc and FIG. 1(b) is a cross sectional view taken along the line A—A' in FIG. 1(a). In FIG. 1, reference numeral 1 denotes an optical disc; 2 is a center hole adapted to attach the optical disc to a disc motor; 3 indicates data recording area of a plurality of tracks consisting of sectors having data field portions DF in which no data is recorded; 4 data read-only area of a plurality of tracks consisting of sectors having data field portions DF in which data has previously been recorded; 5 a disc substrate made of polycarbonate resin or the like; 6 tracks which are formed as grooves in the disc substrate; 6a data recording area; 6b data read-only area; 7 a recording material in which signals can be optically or thermally recorded by a laser beam; and 8 a protecting layer to protect the recording material 7. $S_0, S_1, S_2, \ldots, S_n$ denote sectors; ID represents sector identifier portions in which the address information of the sectors $S_0$ to $S_n$ is recorded; and DF indicates the data field portions to record data.

The optical disc 1 is formed in the following manner. The groove-shaped tracks 6 are formed in the disc substrate 5. Each track is divided into a plurality of sectors comprising the sector identifier portions ID and data field portions DF. The recording material 7 is uniformly evaporation-deposited on the disc substrate 5 having the tracks 6 so as to cover the whole surface of the disc.

By irradiating a recording laser beam of a large power onto the recording material 7 in the data recording area 3, the beam signal can be recorded in the data recording area as changes in reflectance or a formation of holes. If the recording material 7 is a magneto-optic material, by reversals of the magnetic domain, the recorded signal can be read out on the basis of the rotation of the polarizing wave front of the reflected light by the Faraday effect. In the data read-only area 4, the recording material 7 functions as a reflecting film to reflect a reading laser beam of weak power.

As described above, according to this embodiment, by forming the same recording material 7 in the data read-only area 4 and in the data recording area 3, read-only type optical discs having recordable sectors can be easily manufactured.

FIG. 2 is an explanatory diagram of data field identification flags F ($F_1$, $F_2$) in the sector identifier portions ID of the optical disc in the foregoing embodiment.

In the diagram, FIG. 2(a) shows a sector format of the data read-only area 4 in which data is recorded as concave and convex forms in the data field portion DF. FIG. 2(b) is a sector format of the data recording area 3 in which the data field portion DF is the groove-shaped track segment of a uniform depth. FIG. 2(c) shows a practical example of an address ADR, a data field identification flag $F_1$, and error detection code CRC in the data read-only area 4. FIG. 2(d) shows a practical example of an address ADR, a data field identification flag $F_2$, and error detection code CRC in the data recording area 3.

In the sector identifier portion ID, PR denotes a preamble to reproduce a clock; AM is an address mark to indicate the start of the address information; ADR is the address; $F_2$ the data field identification flag indicative of the data recording area 3; $F_1$ the data field identification flag indicative of the data read-only area 4; CRC the error detection code such as cyclic-redundancy code or the like; and PO a postamble. $G_1$ and $G_2$ denotes gaps in which no information is recorded in order to absorb the fluctuation in the rotation of the optical disc.

In the data field portion DF, SYNC denotes a clock sync signal to reproduce a clock; DM is a data mark indicative of the start of the data; DATA indicates data; ECC represents error detection/correction code; and RESYNC represents a RE-SYNC pattern to make word synchronization for data demodulation.

The address ADR comprises; two bytes of the track address information; a track address (high byte) TA (H); a track address (low byte) TA (L); and sector address information SA. The operation with the examples of FIG. 2 will now be described hereinbelow.

When the optical disc drive apparatus reads out an arbitrary sector identifier portion ID, the data field identification flag F are detected as, for example, $F_1=1$ or $F_2=0$ as shown in FIGS. 2(c) or 2(d). The optical disc drive apparatus immediately knows whether this sector belongs to that with the data read-only area 4 or that with the data recording area 3 and performs controls such as prevention of erroneous writing of data, waveform equalization of the reproduction signal, optimization of the servo loop gain, and stabilization of the search of a desired track, which will be explained hereinafter.

FIG. 3 is an enlarged cross sectional view of the tracks of the optical disc in the foregoing embodiment. FIG. 3(a) illustrates a partial enlarged diagram of the sector identifier portion ID, gap $G_1$, and data field portion DF in the data read-only area 4. FIG. 3(b) shows a partial enlarged diagram of the sector identifier portion ID, gap $G_1$, and data field portion DF in the data recording area. FIG. 3(c) is a waveform diagram of the reproduction signal in the data recording area of FIG. 3(b).

In FIG. 3, the tracks in the data read-only area 4 and data recording area 3 are formed with the same recording material 7. The address information of the sector is formed in each sector identifier portion ID by concave and convex pits P. In addition, the data is formed in the data field portion DF in the data read-only area 4 by concave and convex pits P similarly to the sector identifier portion ID. The data field portions DF in the data recording area 3 are grooves of a uniform depth, wherein data recorded by the user is recorded in the recording material 7 as dots D such as of reflectance changes, reversals of the magnetic domain, holes, or the like.

As shown in FIG. 3(c), the reproduction amplitude $A_1$ of the pit portion P differs from the reproduction amplitude $A_2$ of the dot portion D. When the phase change recording material is evaporation-deposited such that the depth of a groove is equal to $\frac{1}{8}$ of the wavelength, in general, the following relationship of the reflectances is satisfied: namely, the reflectance of the dot portion > the reflectance of the land portion > the reflectance of the pit portion. On the other hand, since the optical characteristics of the pit portion and land portion differ, the frequency characteristics of the reproduction signals may also differ. Therefore, the waveform equalization amounts and the binary-clipping levels need to be controlled in accordance with the data recording area 3 and data read-only area 4.

Since the same recording material 7 is formed in the areas 3 and 4, there is no need to separately form the reflecting layer such as aluminum or the like in the area 4 and to form the recording material 7 in the area 3 as in conventional optical discs. Therefore, it is unnecessary to specially form buffer portions in which no data is recorded at boundary regions between the areas 3 and 4.

FIG. 4 is an external view of an embodiment of a cartridge of the optical disc of the invention. In FIG. 4, reference numeral 10 denotes a cartridge; 11 is a shutter of a window for recording and reproducing in order to irradiate a laser beam onto the optical disc 1; 12 is a disc identifier to identify the kind of disc such as R/O (read only) type, W/O (write once) type, W/E (erasable) type, or the like; and 13 a write protecting notch to set the permission/inhibition of the writing of the data into the data recording area 3 of the optical disc 1.

Figure 5:
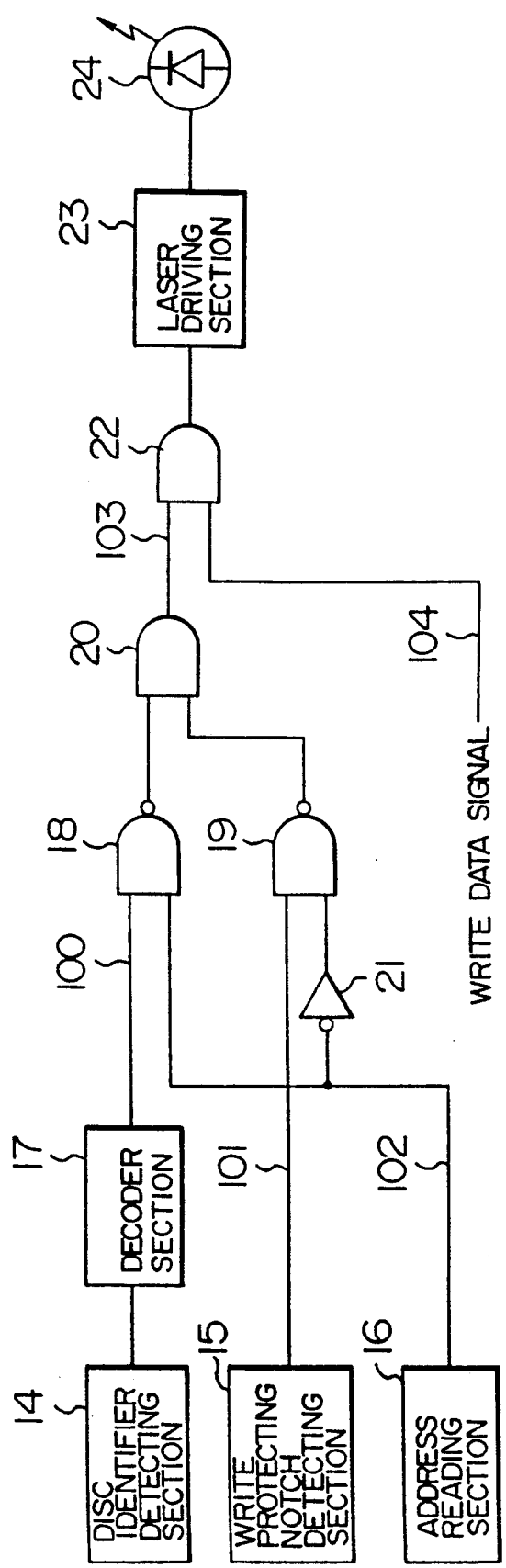
FIG. 5 is a block diagram of an embodiment of a write protecting (enabling or disabling) circuit of an optical disc drive apparatus of the invention.

FIG. 5 shows a block diagram of an embodiment of a write protecting circuit to permit/inhibit the writing of the data into the optical disc in the optical disc drive apparatus of the invention.

Reference numeral 14 denotes a disc identifier detecting section to detect the disc identifier 12 of the cartridge; 15 is a write protecting notch detecting section to detect the setting of the write protecting notch 13 and to output a write protection detection signal 101; 16 an address reading section to read the address information from the sector identifier ID of a current sector and to output a data field identification flag signal 102; 17 a decoder section for decoding the output of the disc identifier detecting section 14 and for generating an R/O disc detection signal 100; 18 and 19 two-input NAND gates; 21 an inverter; 20 and 22 AND gates; 23 a laser driving section; and 24 a semiconductor laser.

The operation of the optical disc drive apparatus shown in FIG. 5 and using the optical disc 1 and cartridge 10 shown in FIGS. 1 and 4 will now be described hereinbelow.

When the cartridge 10 of the R/O disc 1 is set into the optical disc drive apparatus, the disc identifier detecting section 14 reads the disc identifier 12 of the cartridge 10 and interprets by the decoding section 17 and outputs the R/O disc detection signal 100. The notch detecting section 15, on the other hand, reads the setting of the write protecting notch 13 of the cartridge 10 and outputs the write protection detection signal 101. Further, the address reading section 16 reads the sector identifier portion ID of the optical disc 1 by the laser beam and outputs the data field identification flag F of the sector identifier portion ID as the data field identification flag signal 102. When the signal 102 is valid and indicates the data read-only area 4, the output of the NAND gate 18 becomes a low level by the signals 100 and 102, thereby setting a write protection signal 103 as the output of the AND gate 20 to be valid (low level). Since the signal 103 is at a low level, a write data signal 104 as an input to the laser driving circuit 23 is made invalid by the AND gate 22, so that the semiconductor laser 24 does not produce the recording power output.

When the flag signal 102 is invalid and indicates the data recording area 3, the output of the NAND gate 19 is set to a low level by the write protection detection signal 101 and by the signal of which the flag signal 102 was inverted by the inverter 21 if the signal 101 indicates the inhibition of the writing, thereby setting the write protection signal 103 as the output of the AND gate 20 to be valid (low level). Thus, it is prevented that the semiconductor laser 24 produces the recording power output as in the case of the foregoing data read-only area 4.

If the detection signal 101 indicates the permission of the writing, the output of the NAND gate 19 becomes high, thereby making the signal 103 as the output of the AND gate 20 invalid (high level). Thus, the write data signal 104 is transmitted through the AND gate 22 and drives the laser driving section 23. The power of the semiconductor laser 24 is modulated by the recording power output, thereby recording the write data signal 104 into the current relevant sector.

As described above, according to the above embodiment, by providing the data field identification flag F in the sector identifier portion ID of the optical disc and by providing the disc identifier and write protecting notch for the cartridge, the erroneous writing of data into the data read-only area can be inhibited and at the same time, the permission/inhibition of the writing of data into the data recording area can be selectively and freely set.

Figure 6:
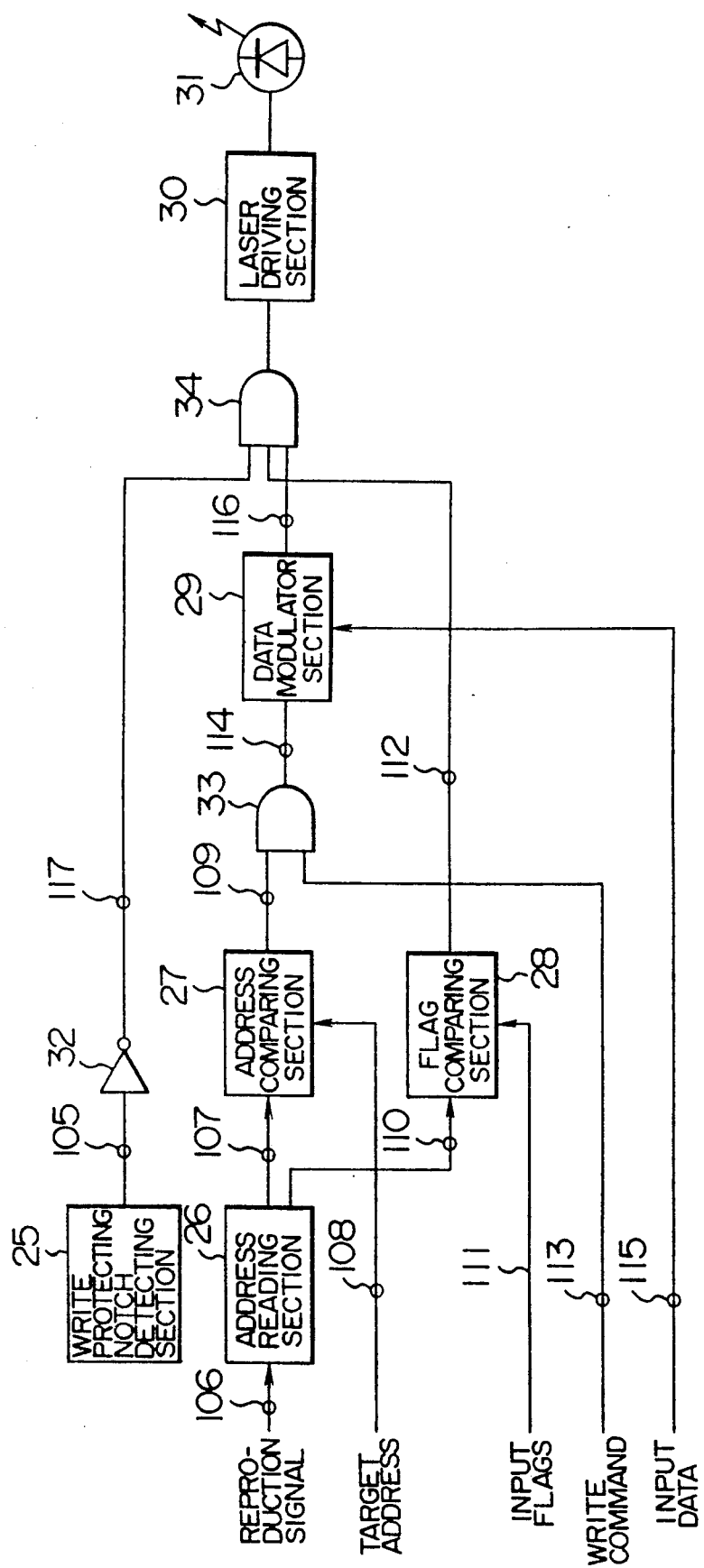
FIG. 6 is a block diagram of another embodiment of a write protecting (enabling or disabling) circuit of an optical disc drive apparatus of the invention.

FIG. 6 shows a block diagram of another embodiment of a write protecting circuit for permitting/inhibiting the writing of data into the optical disc drive apparatus in an information recording and reproducing apparatus of the present invention.

Reference numeral 25 denotes a write protecting notch detecting section for detecting the setting of the write protecting notch 13 and for outputting a write protection detection signal 105; 26 is an address reading section for reading address information 107 and a data field identification flag signal 110 which are included in the sector identifier portion ID of the sector from a reproduction signal 106; 27 an address comparing section for comparing the address information 107 with target address information 108; 28 a flag comparing section for comparing the flag signal 110 with an input flag 111 generated from CPU mentioned later; 29 a data modulating section for modulating input data 115; 30 a laser driving circuit section; 31 a semiconductor laser; 32 an inverter; and 33 and 34 AND gates.

The operation of the information recording apparatus shown in FIG. 6 will now be described hereinbelow by use of the optical disc 1 and cartridge 10 shown in FIGS. 1 and 4.

When the cartridge 10 of the R/O disc 1 is set into the information recording apparatus, the write protecting notch detecting section 25 reads the setting of the write protecting notch 13 of the cartridge 10 and outputs the write protection detection signal 105. Further, address reading section 26 reads the sector identifier portion ID of the optical disc 1 by a laser beam and outputs the address information 107 of the sector identifier portion ID to the address comparing section 27 and the data field identification flag signal 110 to the flag comparing section 28.

The section 27 compares the address information 107 with the target address information 108 and transmits an address coincidence output 109 to the AND gate 33.

The flag comparing section 28 compares the input flag 111 with the flag signal 110 and outputs a flag coincidence output 112 to the AND gate 34.

First, the operation to inhibit the writing of data into the data read-only area 4 will be explained hereinbelow.

Since the writing of data is permitted to only the data recording area 3, the input flag 111 is set by the CPU to correspond to the data field identification flag indicative of the data recording area 3.

Namely, in the case of the data read-only area 4, the flag signal 110 differs from the input flag 111, so that the flag coincidence output 112 of the flag comparing section 28 becomes invalid (low level). Therefore, even if the target address information 108 and a write command 113 are applied in which the sector in the area 4 is used as the target sector and the address comparing section 27 outputs the address coincidence output 109 and the data modulating section 29 is made operative, a write data signal 116 from the section 29 is blocked by the AND gate 34, and the input to the laser driving section 30 is made invalid, thereby preventing that the semiconductor laser 31 produces the recording power output. Thus, it is prevented that the data is erroneously written into the data field portion DF of the sector in the data read-only area 4.

The operation to write data into the data recording area 3 will now be described hereinbelow.

The input flag 111 is set by the CPU to correspond to the data field identification flag indicative of the data recording area 3 and the flag coincidence signal 112 becomes valid (high level).

If the write protection detection signal 105 indicates the inhibition of the writing (high level), a signal 117 of which the detection signal 105 was inverted by the inverter 32 sets the output of the AND gate 34 to a low level, thereby preventing that the semiconductor laser 31 produces the recording power output similarly as in the case of the foregoing data read-only area 4. If the detection signal 105 indicates permission to write (low level), the output of the inverter 32 becomes a high level. Therefore, the predetermined target address information 108 and write command 113 are applied. When the address comparing section 27 detects a desired sector and makes the address coincidence output 109 valid (high level), the AND gate 33 makes a signal 114 valid (high level) and the data modulating section 29 is made operative, so that the input data 115 is modulated by the section 29 and is transmitted as the write data signal 116 through the AND gate 34 and drives the laser driving section 30. Thus, the power of the semiconductor laser 31 is modulated by the recording power output, thereby recording the write data signal 116 into the related sector.

As described above, according to the above embodiment, by comparing the data field identification flags F provided in the sector identifier portion ID of the optical disc together with comparing the address information and by forming the write protecting notch, the erroneous writing of the data into the data read-only area can be inhibited and the permission/inhibition of the writing of data into the data recording area can be freely and selectively set.

Figure 7A:
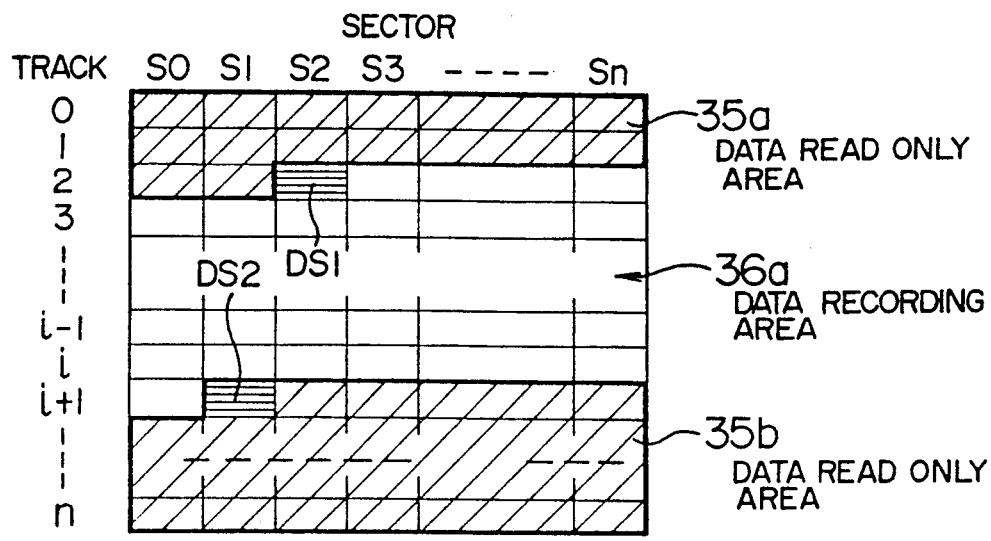
FIG. 7(a, b) exemplarily shows track allocation diagrams of the optical disc of the invention.

FIG. 7 is a track allocation diagram of the optical disc of the invention. FIG. 7(a) shows an embodiment of a track allocation which are divided into data read-only areas 35a and 35b and a data recording area 36a on the basis of sectors. This allocation is constituted by: the data read-only area 35a constituted from sector $S_0$ in track 0 up to sector $S_1$ in track 2; the data recording area 36a from sector $S_2$ in track 2 up to sector $S_0$; in track (i+1) and the data read-only area 35b from sector $S_i$ in track (i+1) up to sector $S_n$ in track n. A dummy sector $DS_1$ corresponding to sector $S_2$ in track 2 is provided in the boundary between the areas 35a and 36a and belongs to the data recording area 36a. A dummy sector $DS_2$ corresponding to sector $S_1$ in track (i+1) is provided in the boundary between the areas 36a and 35b and belongs to the data read-only area 35b.

Figure 7B:
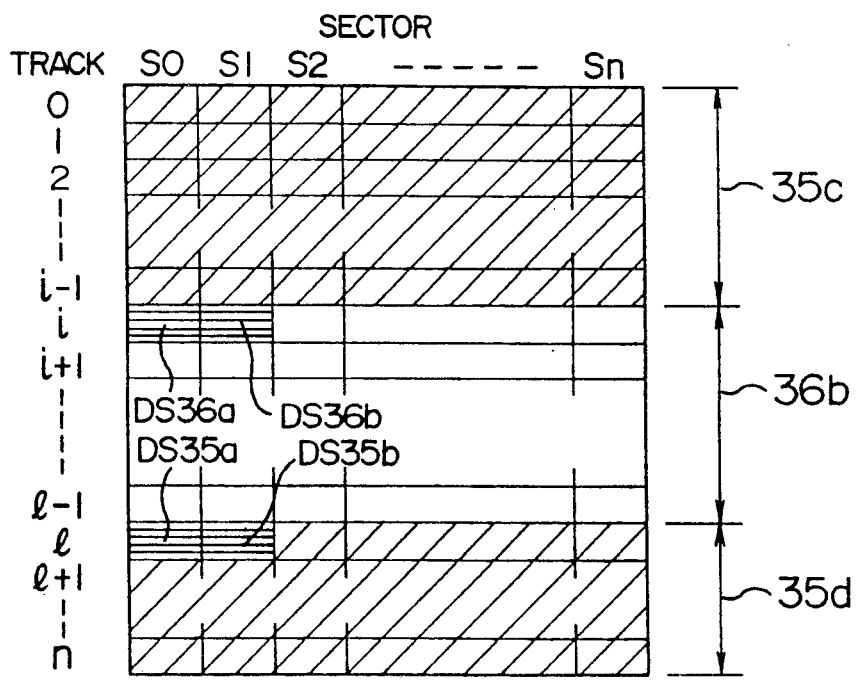

FIG. 7(b) shows an embodiment of a track allocation which are divided into data read-only areas 35c and 35d and a data recording area 36b on the basis of tracks. This allocation is constituted by: the data read-only area 35c from sector $S_o$ track 0 up to sector $S_n$ in track (i−1); the data recording area 36b from sector $S_o$ in track i up to sector $S_n$ in track (l−1); and the data read-only area 35d from sector $S_n$ in track l up to sector $S_n$ in track n. Two dummy sectors $DS_{36a}$ and $DS_{36b}$ corresponding to sectors $S_0$ and $S_1$ track i are provided in the boundary between the areas 35c and 36b and belong to the data recording area 36b. Two dummy sectors $DS_{35a}$ and $DS_{35b}$ corresponding to sectors $S_p$ and $S_1$ track l are provided in the boundary between the areas 36b and 35d and belong to the data read-only area 35d.

Each of the dummy sectors $DS_1$, $DS_{36a}$, and $DS_{36b}$ which belong to the data recording areas 36a and 36b comprises: the sector identifier portion ID having the data field identification flag F indicative of the data recording area; and the data field portion DF in which no data is recorded. Each of the dummy sectors $DS_2$, $DS_{35a}$, and $DS_{35b}$ which belong to the data read-only areas 35b and 35d comprises: the sector identifier portion ID having the data field identification flag F indicative of the data read-only area; and the data field portion DF where no data is preliminarily recorded.

Referring to FIG. 7, as will be explained hereinafter, even when an error occurs in the sector identifier portion ID of the sector in which the data is recorded and this sector cannot be found out, the reproduction signal can be read out of each area under the optimum reading condition by use of the data field identification flags in the sector identifier portions ID of the head dummy sectors of the data read-only areas 35b and 35d or of the data recording areas 36a and 36b.

Figure 8:
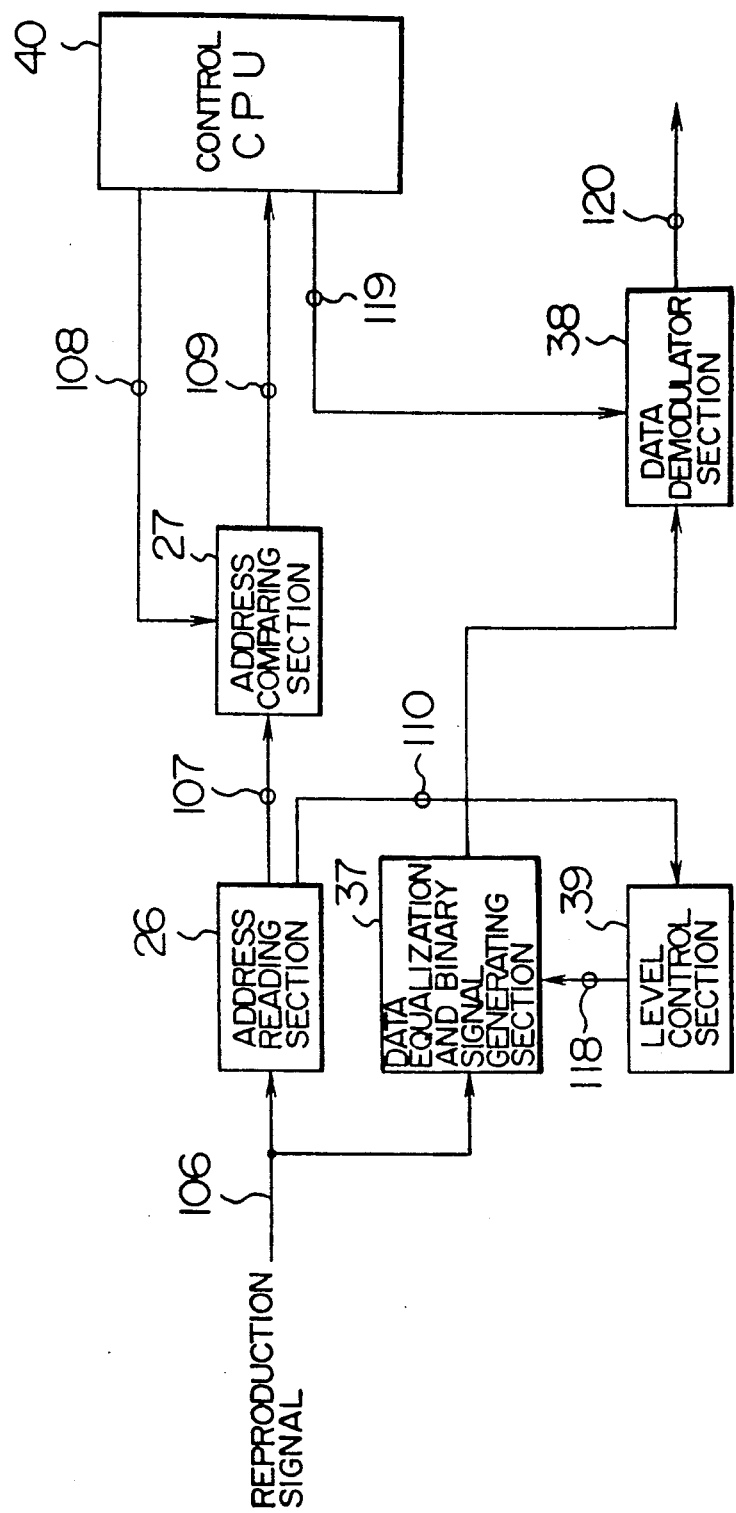
FIG. 8 is a block diagram of an embodiment of a data reading circuit for performing the data reproduction on the optical disc in the optical disc drive apparatus of the invention.

FIG. 8 shows a block diagram of a data reading circuit for performing the data reproduction from the optical disc in the optical disc drive apparatus of the invention. In FIG. 8, reference numberal 37 denotes a data equalization and binary signal generating section for performing waveform equalization to correct the deterioration of the frequency characteristic of the reproduction signal 106 and converting the analog signal into a binary signal; 38 is a data demodulating section for digitally demodulating the output of the section 37; 39 a level control section for generating a level control signal 118 to control the waveform equalization amount and binary-clipping level of the section 37 in response to the data field identification flag signal 110; 26 the address reading section for reading the address information and data field identification flag from the sector identifier portion ID; 27 the address comparing section for detecting the coincidence between the target address signal 108 and read address signal 107 and for outputting the address coincidence signal 109; 40 a control CPU for producing the target address signal 108 to control the data demodulation for the target sector, for detecting the address coincidence signal 109 and for outputting a data demodulation enable signal 119 to make the data demodulating section 38 operative; and 120 a read data signal.

The operation of the optical disc drive apparatus shown in FIG. 8 will now be described hereinbelow.

When the optical disc 1 is set into the optical disc drive apparatus, the address reading section 26 reproduces the sector identifier portion ID of the optical disc by a laser beam and reads out the address information and data field identification flag of the sector identifier portion ID and outputs the address signal 107 and data field identification flag signal 110.

The waveform equalization amount and binary-clipping level of the address reading section 26 are set to the level for the data read-only area 4. By changing the level control signal 118 of the level control section 39, the data field identification flag signal 110 is referred to set the waveform equalization amount and binary-clipping level in the section 37 so that the bit error rate of the read data signal 120 becomes a minimum value when the reproduction signal 106 is demodulated by the data demodulating section 38. For example, in the case of the binary-clipping level, if the flag signal 110 indicates the data read-only area 4, the level control signal 118 sets the binary-clipping level of ½ of the amplitude $A_1$ of the reproduction signal of the sector identifier portion ID in FIG. 3(c) into the data equalization and binary signal generating section 37. On the other hand, if the flag signal 110 indicates the data recording area, the level control signal 118 sets the binary clipping level of $\frac{1}{2}$ of the amplitude $A_2$ of the reproduction signal of the data field portion DF in FIG. 3(c) into the section 37.

The control CPU 40 outputs the target address signal 108 to the address comparing section 27. When the read address signal 107 coincides with the target address signal 108, the section 27 outputs the address coincidence signal 109. When the control CPU 40 detects the address coincidence signal 109, it outputs the data demodulation enable signal 119 to the data demodulating section 38, thereby starting the data demodulating operation. The section 38 digitally demodulates the binary signal supplied from the section 37 and outputs the read data signal 120.

If the address coincidence signal 109 is not detected, the control CPU 40 outputs the target address signal 108 having the address value of (the target address value $-1$) to the section 27. When the read address signal 107 coincides with the new target address signal 108, the section 27 outputs the address coincidence signal 109. The data field identification flag signal 110 which was read out of the sector corresponding to the target address signal 108 having the address value of (the target address value $-1$) supplies the level control signal 118 such as to allow section 37 to perform the optimum reading operation. Next, the control CPU 40 detects the address coincidence signal 109 and waits for only the period of time corresponding to one sector and then outputs the data demodulation enable signal 119 to the data demodulating section 38, thereby starting the data demodulating operation of the target sector. The foregoing operations correspond to the cases of the dummy sectors $DS_1$ and $DS_2$ in FIG. 7(a).

Further, if an error still occurs with a sector identifier portion ID even with the above operation with the address value of (the target address value $-1$), the address value of (the target address value $-2$) may be given to the target address signal 108 by use of the allocation with two dummy sectors $DS_{36a}$ and $DS_{36b}$ or $DS_{35a}$ and $DS_{35b}$ shown in FIG. 7(b). With the allocation, the control CPU 40 waits for only the period of time corresponding to two sectors after the address coincidence signal 109 was detected. Then, the CPU 40 outputs the data demodulation enable signal 119 to the section 38, thereby reading out the target sector. By producing the target address signals 108 indicative of the address value of (the target address value $-1$) and the address value of (the target address value $-2$), data can be recovered and reproduced even from data read-only area or recording area with two continuous defective sector identifiers. Therefore, the optimum binary-clipping level and waveform equalization amount can be set with the high reliability and the data reading reliability can be increased.

As described above, according to the above embodiment, in order to detect the data field identification flags of the sector identifier portions of the optical disc the dummy sectors are provided for the head sectors of the data read-only area and the data recording area, and the data recovery operations can be executed with those dummy sectors against possible errors caused in sector identifier portions. Therefore, the data field identification flags of all the sectors in the current related area can be detected with high reliability. The data reading conditions can be controlled so as to correct the differences of the reproduction signal amplitudes and of the frequency characteristics of the data field portions. In this manner, the data can be read out of the R/O disc having the data recordable area with high reliability.

Figure 9:
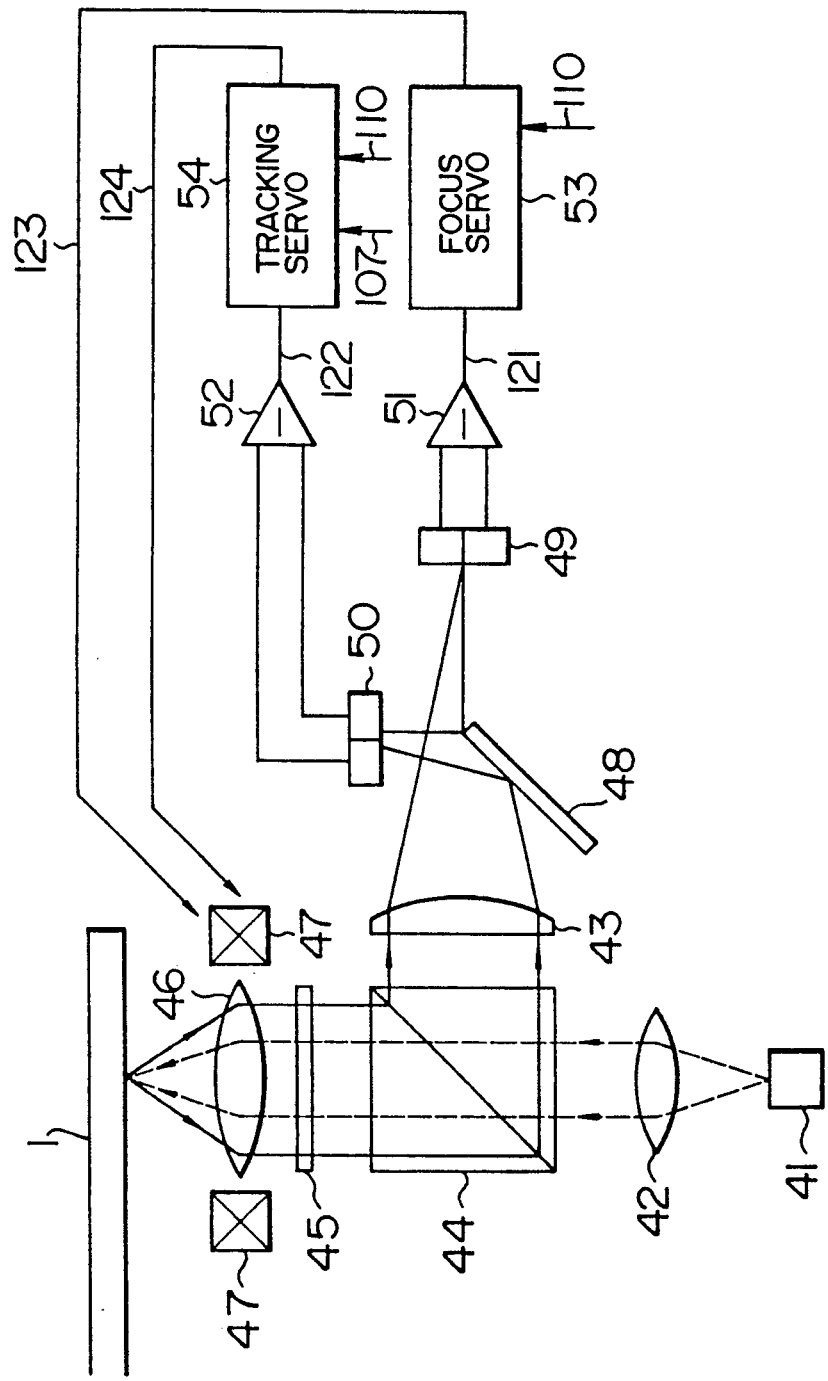
FIG. 9 is a block diagram of an optical detecting system and a servo system in the embodiment.

FIG. 9 shows a block diagram of the optical detecting system and the servo system in the optical disc drive apparatus. Reference numeral 1 denotes the optical disc for recording and reproducing information; 41 is a semiconductor laser of a wavelength $\lambda$; 42 and 43 condenser lenses; 44 a polarizing beam splitter; 45 a $\frac{1}{4}$ wavelength plate; 46 a focusing lens; 47 a focusing lens actuator; 48 a mirror to separate the reflected light; 49 a focusing photodetector; 50 a tracking photodetector; 51 and 52 differential amplifiers; 53 a focus servo circuit section; and 54 a tracking servo circuit section.

The light emitted from the semiconductor laser 41 progresses as indicated by broken lines and passes through the focusing lens 46 and is focused onto the track of the disc, thereby performing the recording and reproducing operations. The reflected light then passes through the beam splitter 44 and condenser lens 43 as shown by solid lines and is separated by the mirror 48. The separated light enters the focusing photodetector 49 and tracking photodetector 50, respectively. Thus, a focus error signal 121 and a tracking error signal 122 are outputted through the difference amplifiers 51 and 52, respectively. Drive signals 123 and 124 of the focusing lens actuator are outputted by the focus servo circuit 53 and tracking servo circuit 54 and the focusing lens 46 is driven to the optimum position such that the error signals 121 and 122 become zero. In this manner, the well-known focus control and tracking control are performed.

Figure 10:
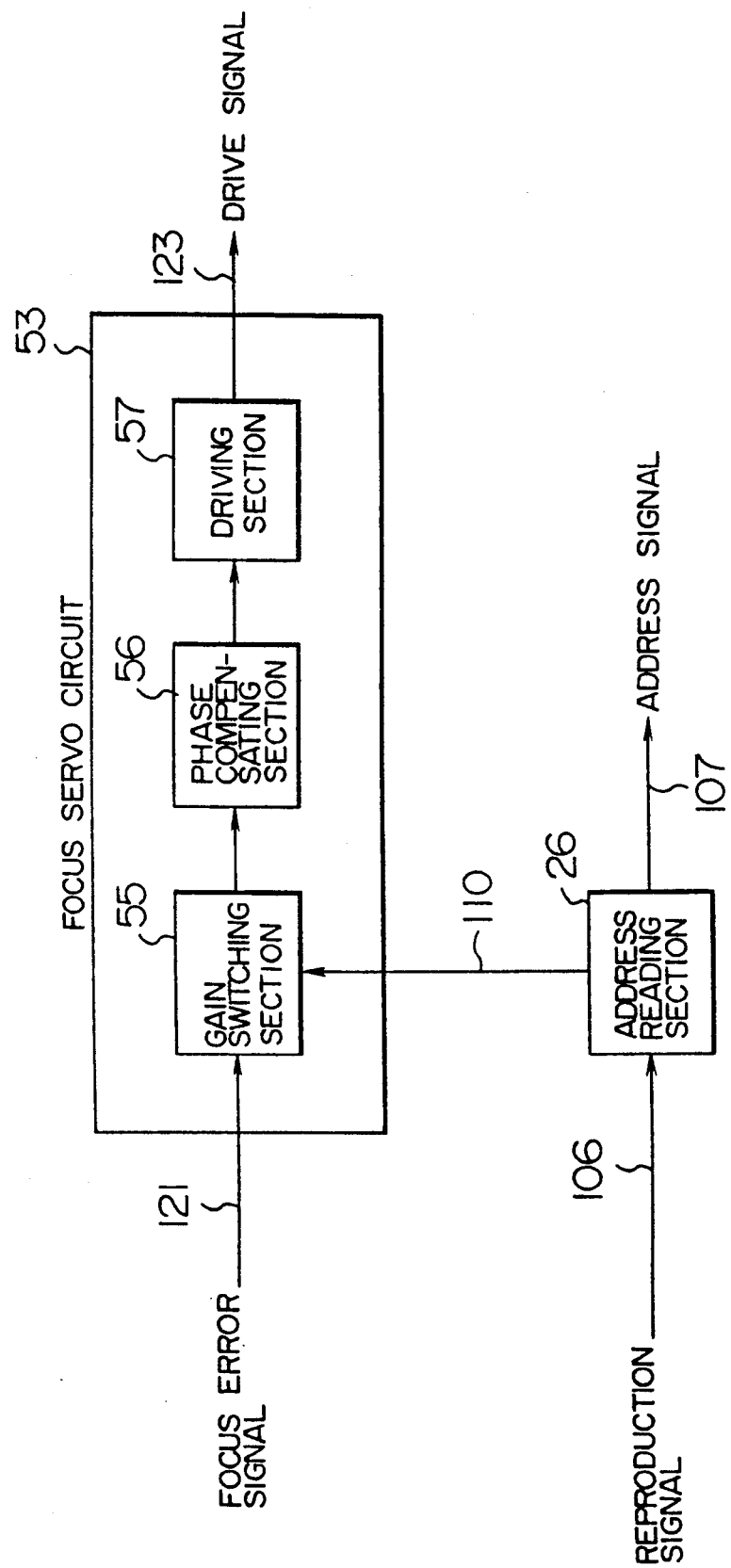
FIG. 10 is a block diagram of an embodiment of a servo circuit of the optical disc drive apparatus of the invention.

FIG. 10 is a detailed diagram of the focus servo circuit section 53. In this diagram, the focus error signal 121 derived from the focus servo photodetector 49 passes through a gain switching section 55 and a phase compensating section 56 and is supplied to a driving circuit section 57. The drive signal 123 is outputted to drive the focusing lens 46 so that the focus error signal 121 becomes zero. The flag signal 110 is sent to the gain switching section 55 in the focus servo circuit section 53, thereby switching the gain such that the loop gain of the focus servo becomes constant.

In this manner, in the data recording area 3, it is possible to eliminate the instability of the servo characteristic due to the large amplitude of the focus error signal and the large loop gain of the focus servo because of the large reflectance. In the data read-only area 4, the loop gain of the focus servo decreases since the reflectance is small, and the deterioration of the servo tracking performance can be compensated, and the loop gain can be always made constant.

With respect to the tracking servo, the stable tracking servo can be also performed by constituting the circuit similarly to the foregoing focus servo.

As described above, according to the embodiment, by switching the gain such that the loop gains of the focus and the tracking servo become constant in each of the data read-only area and the data recording area, the optimum recording and reproducing operations of the R/O disc having the data recordable area can be executed.

Figure 11:
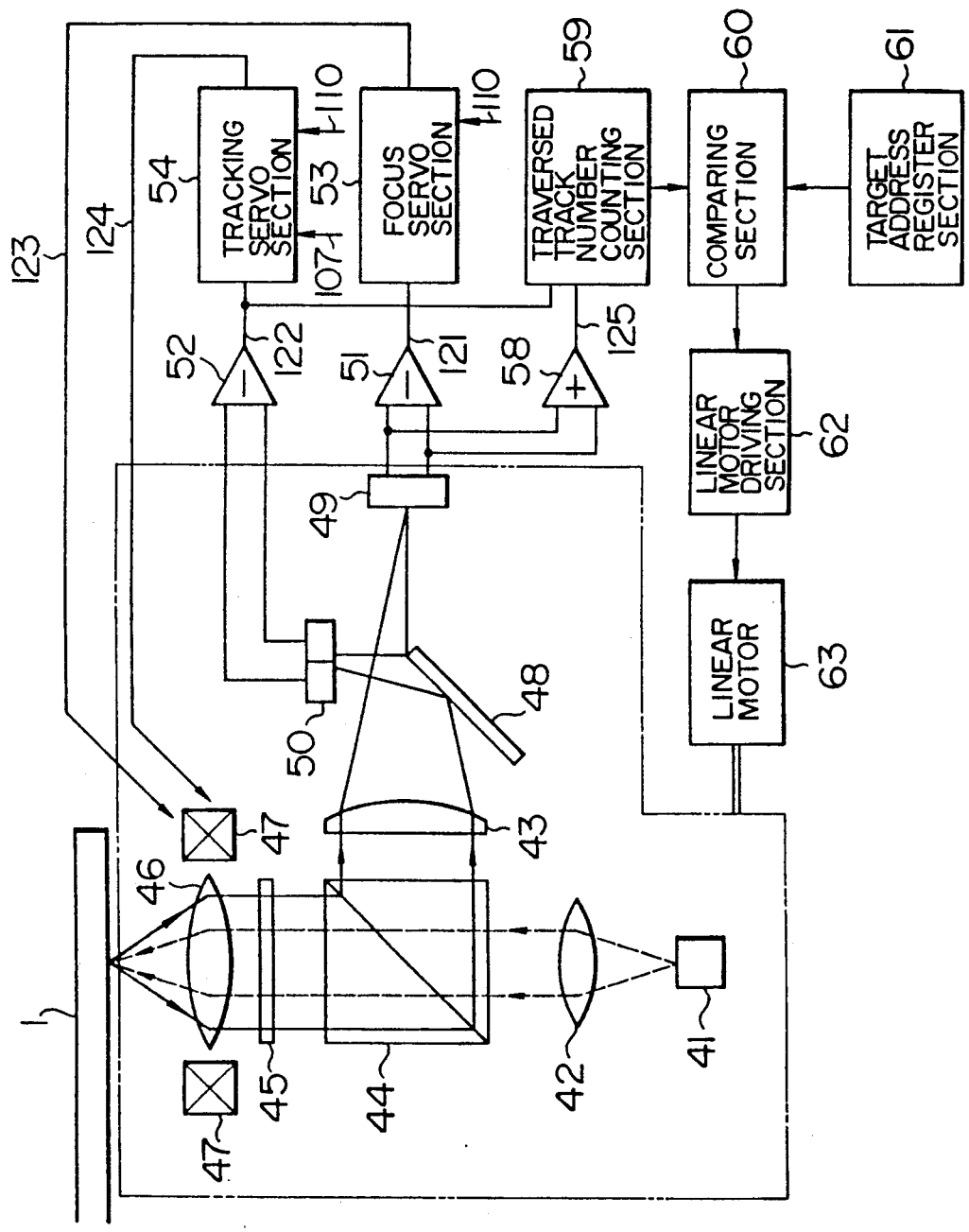
FIG. 11 is a block diagram of the optical detecting system, servo system, and search system in the embodiment.

FIG. 11 shows a block diagram of the optical detecting system, servo system, and search system in the optical disc drive apparatus of the invention. In FIG. 11, the parts and components indicated at reference numerals 41 to 54 are the same as those shown in FIG. 9. Reference numeral 58 denotes a differential amplifier; 59 is a traversed track number counting circuit section; 60 a comparator section for comparing the target track with the output of the counting circuit section 59 in order to detect their coincidence; 61 a target track address register for storing the target track address value; 62 a linear motor driving circuit section; and 63 a linear motor to move an optical head surrounded by a broken line.

A focus sum signal 125 of the differential amplifier 58 is input to the counting circuit section 59 together with the tracking error signal 122. As disclosed in U.S. Pat. No. 4,484,319, "Apparatus for locating a track on disclike optical information carriers" herein incorporated by reference, the true number of tracks which are traversed by the laser beam is counted and this true track number is obtained by correcting a possible eccentricity of the optical disc 1 from the polarity of the tracking error signal 122 using the phase of the focus sum signal 125 as a reference signal.

The rough search by the linear motor 63 is executed in a manner such that the value of the target track address register section 61 is compared with the output of the counting circuit section 59 by the comparing section 60 and when they coincide, the driving of the linear motor driving circuit section 62 is stopped.

After completion of the rough search, the tracking servo circuit 54 is made operative, thereby tracing a predetermined track.

When the address of the track which is being tracked is read out and if it differs from the target track, the track is again searched. The difference between the searched track and the target track is called the search error and this error is caused by the possible erroneous counting of the number of traversed tracks. If the search error is smaller than a predetermined value, the focusing lens actuator 47 is driven by the tracking servo circuit 54 to skip the tracks, thereby performing a fine search to move to the target track while checking the track address by the signal 107. If the search error is large, the linear motor is again driven and the rough search is reexecuted.

Figure 12A:
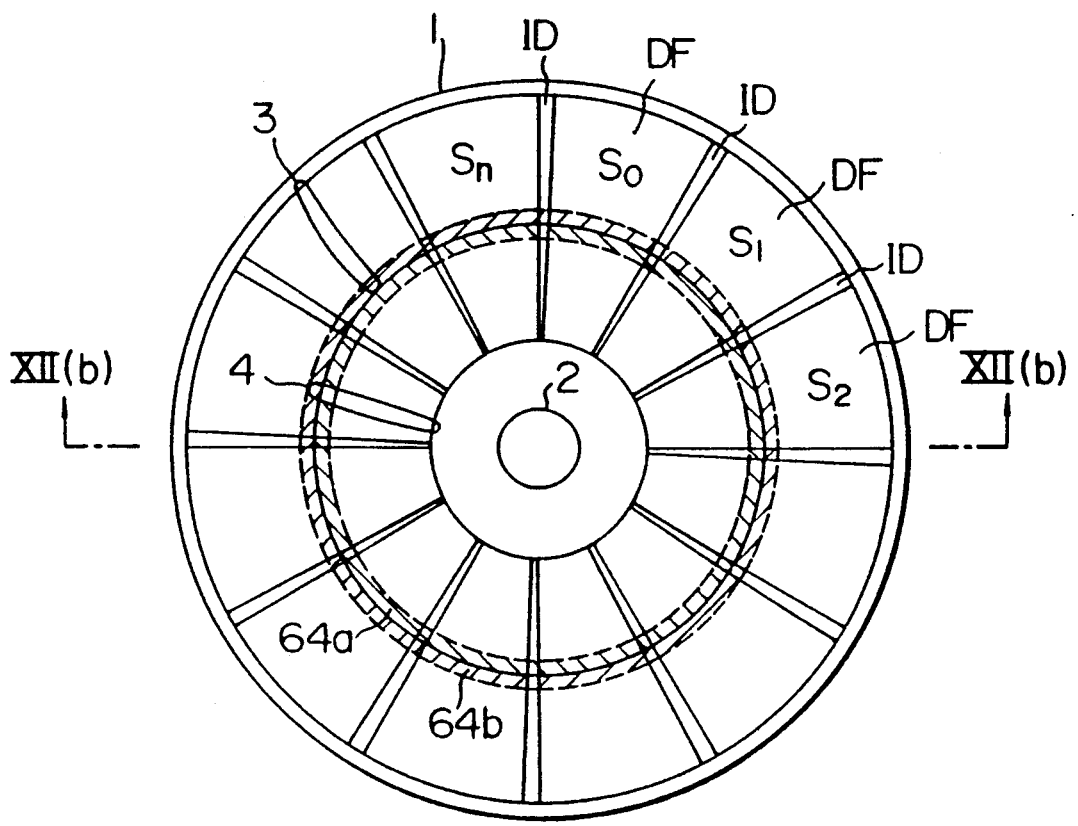
FIGS. 12(a) and 12(b) are a plan view and a a cross-sectional view of another embodiment of an optical disc of the present invention, respectively.
Figure 12B:
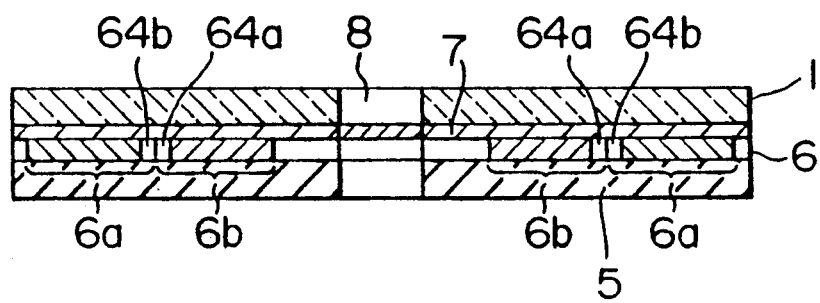

FIG. 12 is an external view of an embodiment of the optical disc of the invention. In the diagram, reference numerals 64a and 64b denote guard areas where no data is recorded. In FIG. 12, since no data is recorded in the guard areas 64a and 64b, these areas are not used for the search start address nor for the search target address. Therefore, if the guard areas 64a and 64b provided in the data read-only area 4 and data recording area 3 are larger than the numbers of erroneously searched tracks, when the searching operation is shifted from the data read-only area 4 (or data recording area 3) to the data recording area 3 (or data read-only area 4), the target area portion, in this just-mentioned case, the track in the area 3 (or area 4) can be accessed to after completion of the rough search by the linear motor 63 even in the worst case. Therefore, the fine search can be executed in the same portion of the data recording area 3 (or data read-only area 4), so that the problem of instability in the tracking servo can be solved.

On the other hand, if none of the guard areas 64a and 64b is provided or even if they are provided, when they are smaller than the track number due to the search error, it is impossible to accurately determine whether a track detected after completion of the rough search by the linear motor 63 belongs to the data recording area 3 or to the data read-only area 4. When the searching operation is shifted from the area 4 (or area 3) to the area 3 (or area 4), if there occurs a case where a portion near the boundary between the areas 3 and 4 is accessed to by the first trial of the search and the boundary is skipped over by track jump of the subsequent fine search, the tracking becomes unstable by a large change in reflected light amount and this may cause the result such that the tracks are irregularly skipped and many trials are needed to skip a predetermined number of tracks or that the target track cannot be accessed. Therefore, in the search of tracks in the areas 3 and 4, by providing the guard areas over the search errors in the boundary between the areas 3 and 4, the area to which a target track belongs can be certainly accessed by the first trial of the search, so that any desired track can be stably searched.

As described above, according to the above embodiment, by respectively providing the guard areas having no data in the boundary between the data read-only area and the data recording area of the optical disc, any desired track of the R/O disc having the data recordable area can be stably searched.

As described above, according to the invention, it is possible to provide an optical disc in which the user can freely record data into the R/O disc, and the data read-only area and the data recording area can be stably searched and the data can be accurately read out and to provide a drive apparatus of such an optical disc. The practical effects of the invention are great.

What is claimed is:

1. An optical system comprising:
   (a) an optical disc player; and
   (b) an optical disc;
   said optical disc including a plurality of tracks comprising a plurality of sectors, each sector including a sector identifier portion having sector address information recorded therein and a data field portion for data recording/reproducing, wherein data is reproduced and/or recorded by irradiating a laser beam onto a light-sensitive recording material formed on the tracks;
   said optical disc player including a data recording and reproducing optical head, a linear motor and a track search means for shifting said optical head along said disc by said linear motor to perform a track coarse search operation and a track fine search operation by causing a laser beam emitted by a laser source of the optical head to jump tracks, said player having a characteristic maximum possible number of erroneously searched tracks during said coarse search operation;
   said plurality of sectors of said optical disc comprising:
   a data read-only area comprising a plurality of first sectors having a said data field portion in which data has been recorded in concave and convex phase structure; and
   a data recording/reproducing area comprising a plurality of second sectors having a said data field portion in which data can be recorded, each of said first and second sectors having address information and a data field identification flag recorded in concave and convex phase structure in the sector identifier portion thereof, said flag being set in one of a first state and a second state, said first state indicating that a sector in which a said flag is recorded has a data read-only area and said second state indicating that a sector in which a said flag is recorded has a data recording/reproducing area; and said optical disk further comprising first and second guard areas interposed between said data read-only area and said data recording/reproducing area, said first guard area comprising a first number of said tracks having a concave and convex phase structure substantially identical to that of said data read-only area and said second guard area comprising a second number of said tracks in which data can be recorded as in said data recording/reproducing area, and both said first number and said second number being greater than said characteristic maximum possible number of erroneously searched tracks of said disk player.

* * * * *